United States Patent Office 3,705,837
Patented Dec. 12, 1972

3,705,837
WOODFLAKE COMPOSITION FOR PANELS AND METHOD OF MAKING SAME
Charles S. Breslauer, Brunswick, Ga., assignor to
W. R. Grace & Co., Cambridge, Mass.
No Drawing. Filed June 16, 1970, Ser. No. 46,809
Int. Cl. B32b 5/16, 21/02; B29j 5/04
U.S. Cl. 161—168
11 Claims

ABSTRACT OF THE DISCLOSURE

A specialized wood flake size is described which may be coated with a binder such as portland cement, cast and bonded together to form a lightweight cemented product. The woodflake size and shape provides advantages in making the cemented product. The product itself is especially attractive for use in the construction industry because of its strength and economy and the fact that it is nailable, has good thermal insulation and acoustical properties, responds well to milling and cutting and is attractive in appearance. A novel method is also described for making the product.

BACKGROUND OF THE INVENTION

The invention relates to lightweight cement products. In particular it relates to compositions and products formed therefrom where a form of wood is surface bonded together by a binder coating on the wood.

In the past, construction materials of this type have been made by coating wood fiber (also known as excelsior or wood wool) with hydraulic cement as a binder and casting to the desired dimensions, usually in the form of panels. The panels are primarily useful as roof decks or roof sub-decks, for example, being supported on purlins to form a ceiling and able to support a variety of built-up roofing systems.

Several problems and disadvantages have been identified with the wood fiber product and especially with the wood fiber itself. The wood fiber must be made from seasoned, premium quality wood. It is produced by the grainwise planing of long thin precisely dimensioned strips which is a relatively expensive process. As a result, and especially in view of the widespread search for low cost construction materials, the wood fiber cement product has become economically less attractive and less competitive.

The wood fiber also has a serious drawback in its conversion to a molded product in that it tends to "ball up" and resists uniform distribution in the molds. Expensive and complex screeding apparatus are used to reduce the balls of wood fiber to a loose and/or uniform condition for emplacement in a mold. Even so, considerable hand adjustment in the mold is necessary; and still uniform density in the final product is very difficult to achieve. Lack of uniformity is detrimental both the structural and visual characteristics of the panel.

The delicate lacy appearance of wood fiber board presents a production control difficulty because excess cement frequently will cause "spotting" that is, filling the voids between the fiber strips to produce a large smooth spot in the surface, which unacceptably interrupts the appearance of the surface and makes the reject rate quite high. These and other problems are solved by the present invention whose advantages will be seen by the following description.

SUMMARY OF THE INVENTION

According to the invention, wood flakes which are about 1 to 4 inches long along the grain, about ¼ to 1 inch wide across the grain and up to about 0.030 inch thick are coated with an inorganic mineral-containing rigid setting binder, preferably portland cement. A lightweight deeply textured product is formed by casting the composition in a suitable mold and permitting it to set.

DESCRIPTION OF THE PREFERRED EMBODIMENT

Products, in particular panels or slabs formed in the manner of the invention are remarkably strong for their weight and give surprisingly good thermal insulation and noise reduction characteristics for construction purposes. These products have a particularly desirable capability in that they are nailable with common nails and may be applied for uses such as vertical or steeply sloped applications not available to the products previously known, even with the use of special type nails. Additionally, the new wood flakes product is superior in its ability to be milled or cut for example in forming tongue and groove edges where good clear definition of the shape is possible with excellent resistance to damage during cutting or while in storage, transportation and application.

The wood flakes used in this invention may quite advantageously be made from run-of-the-mill timber which need not be seasoned, dried or otherwise specially treated prior to use. The entire log including the bark may be used without detracting from the end product characteristics. The size and shape of the wood flakes as defined above and the consequent manner of their formation into the cast product are largely determinative of of the advantages seen in the invention.

The dimensions of the flake mixture and especially the length may vary within the 1 to 4 inch range. The variation may be random but may also be predetermined to give appropriate quantities of chosen lengths in a mixture in accordance with desired properties such as density, strength, and appearance. Some quantity of flakes outside the range is tolerable so long as a major proportion of the flakes are sized as defined herein.

Notably, the flakes have two broad faces and are stiff enough not to become misshapen or intertangled but are so flexible that they can be compacted without substantial breakage or stressing. In this regard, the thickness of the wood flakes should not be less than about 0.020 or more than 0.030 inch although as pointed out above some minor quantity of the flakes may depart from this limit without destroying the desired characteristics of the product although it is preferred not to depart from the specified size range. Wood flakes that are too thin tend to curl and therefore not bond well to adjacent flakes. In addition, such flakes increase the overall density of the product and detract from its nailability and its thermal and acoustical characteristics. Flakes that are too thick do not compact well and resist the desired orientation in the product which will be described in detail below.

The composition and products are formed by coating the wood flakes with an inorganic mineral-containing rigid setting binder. Hydraulic cements such as portland cement are preferred. Other suitable binders include magnesite, gypsum, calcium silicate, magnesium oxychloride and magnesium oxysulfate.

Generally an amount of such cement ranging from about 1.25 to 3 parts by weight per part by weight of the wood flakes is employed. The coating on the flakes acts in combination to provide rigidity after setting in addition to its bonding function. The intrinsic strength of the flakes is augmented by the coating beyond the effect produced by merely bonding them together. If too little cement is used, bonding of the flakes is less adequate and the stiffness and hardness required of the structure suffers. Excess cement may result in accumulation of cement between the voids which give an undesirable increase in density with little or no increase in strength. The preferred hydraulic cement provides economy, rigidity and ease of production as well as protecting the coated wood flakes. When using hydraulic cement as the coating in the range of about 1.4 to 1.7 parts by weight of wood flakes, the strength, thermal and acoustical properties are shown by the examples below combine to give a product uniquely appropriate for construction purposes. Panels or slabs of this embodiment are sufficiently strong to be used as roof decks, wall paneling or exterior siding and have a noise reduction coefficient especially emphasized in the range considered most important for human occupancy, as well as good thermal insulating properties.

The lightweight, deeply textured product is formed by casting the coated wood flakes in a loose weave, that is, so that they lie in random lengthwise or grainwise orientation but with their broad faces in substantially parallel or flat relationship in order to maximize the surface bonding. When forming panels, the loose weave is formed so that the flat relationship of the wood flakes parallels the faces of the panel. In depositing the coated wood flakes into a mold, they will tend to take the loose weave formation more or less depending on the weight of cement coated on them and the height from which they are poured or dropped. It has also been found to be significantly advantageous to screed the coated flakes so as to feed and evenly distribute them at a uniform and controlled rate into the mold. By the term "screed" it is meant to modify a batch of coated flakes into a flowing stream of even distribution where the stream may then be directed into a mold. Usually the stream will be moved across the mold so that by its feed rate will distribute the correct amount of charge into the mold. It appears that such a well adjusted manner of deposition forms the loose weave and ultimately the deeply textured appearance better than any amount of hand adjustment or spreading after deposition. By the term "deep texturing" it is meant to define the considerable spaces between the randomly oriented bonded wood flakes and extending visibly into the body of the product several layers.

From the time the wood flakes are first formed from logs until their ultimate deposition in the mold they undergo considerable manipulation. This causes them to split along the grain and chip at their ends, rendering the final flake size of less width and length and notably of less uniformity than in the beginning. An especially pleasing appearance is given to the final product as a result of this effect, combining with the deep texturing to give a rugged or rustic appearance. The cement color can be chosen to enhance the textured appearance to form, for example in the case of grey cement, a desirable weathered appearance. It is a fact that styles and designs come and go without special technical explanation. It is simply a matter of a particular combination being accorded favorable reception. The long lacy delicate appearance of wood fiber boards has become "tired" in the trade whereas the rugged, deep textured appearance of the present invention presents a new and desirable sharply contrasted appearance. The new product also eliminates or sharply reduces reject rate due to "spotting" and fracture of the wood fiber since the former defect is substantially hidden in the new product and the latter is eliminated by the more substantial mass of the flake.

In the process of making the product in its preferred form, that is, where hydraulic cement is the binder, the wood flakes are formed as described above from raw logs, wet, and then mixed with dry hydraulic cement until they are thoroughly coated. The coated flakes are then deposited in a mold in the loose weave formerly described, and cured.

In a preferred mode, the wood flakes are immersed or otherwise soaked in an aqueous sodium silicate solution, and then mixed and coated with the dry hydraulic cement. During the mixing, additional water may be added. It is also desirable to add an aqueous calcium chloride solution. The use of these sodium silicate and calcium chloride solutions per se are not new.

The coated flakes are cast in the mold, and compacted somewhat in the direction generally normal to the flat sides of the flakes. This compaction brings the flakes into such intimate contact as desired to assure good bonding. The compaction, however, should be distinguished from the pressing associated with the formation of high density material which might use granulated wood or other materials as an aggregate in a binder system. In this invention, the composition must not distort or severely stress the wood flakes nor close the spaces between them to an excessive degree. In forming panels compaction of about 2:1 to 3:1 in thickness is desirable, varying generally with the flake size and the desired end product density. The density may vary between about 33–48 pounds per cubic foot and preferably between about 35–40 pounds per cubic foot.

The product may be removed from the mold after initially setting sufficiently to hold its shape. In the case of portland cement setting for approximately 8 hours is recommended with subsequent curing for at least seven days.

The following non-limiting examples illustrate this invention.

EXAMPLE I

A one inch x 12 inch x 12 inch test slab, specimen 1, was made using the following procedure and materials. Green Mississippi loblolly pine logs with the bark on were converted into wood flakes having in major part the approximate dimensions of at least one inch and up to 2 inches along the grain; at least ¼ inch and up to ¾ inch wide; and up to about 0.030 inch thick. The flakes were first immersed in a 2.5° Baumé sodium silicate solution for about 30 seconds and drained for about 30 seconds. The wet flakes were then mixed with dry portland cement powder until they were completely coated with cement. During the mixing, an aqueous calcium chloride solution was added. The coated flakes were cast in a form to set and were compacted from a cast thickness of about 2 inches to a final thickness of 1 inch. The formed slab was cured for seven days. Table V shows the composition and physical characteristics of the slab. The flakes were cast to the extent possible so that they laid flat, with random axial orientation, that is, in the loose weave described above. The final product had a density of about 42 pounds per cubic foot. During processing of the flakes from their formation until final compaction, some chipping at the ends and lengthwise fracture occurred so that the final product, in addition to a deep textured appearance, gave an impression of randomness as to actual flake size and general rugged or natural appearance to the slab. "Spotting" had occurred in some areas but was only detectable upon close scrutiny.

The sample was load tested using quarter point loading. A loading platform was centered over the specimen to bear on two ⅞ inch diameter parallel pipes 12 inches long which had been placed on top of the specimen 5½ inches apart. Each pipe was 2¾ inches from the supported edges of the specimen. Load was applied by initially placing a 55 gallon container and approximately 150 lbs. of weights on the platform. The load was gradually increased by adding water to the container to the point of failure of the specimen. The data and results of the test are shown below.

TABLE I

| | |
|---|---|
| Specimen size | 1" x 12" x 12". |
| Clear span | 11". |
| Weight of 1 sq. ft. sample | 3.5 lbs. |
| Total load applied | 364 lbs. |
| Equivalent load on same 1" board on 31" clear span that would produce the same flexural stress as in above test | 46.32 lb./sq. ft. |
| Equivalent load on 2" board on 31" clear span that would produce same flexural stress | 185.28 lb./sq. ft. |

EXAMPLE II

A test slab, specimen 2, size 2" x 32" x 32" was constructed as in Example I except that compaction was from about 3½ inches. The particular composition and physical characteristics of this specimen are recorded in Table V. This specimen was load tested on a simple 31" clear span (simulating 32 inch joist spacing or 32 inch wide board on bulb T's). Load was hydraulically applied along quarter points of span resulting in fiber stress in the specimen equal to that of a uniform load condition.

The specimen was tested at 7 days and had a moisture content of 20.1% of bone dry weight (bone dry weight is 5.85 pounds per square foot). When stripped from the form the weight was 58.6 lbs. and when tested the weight was 50.0 lbs. The test results are recorded on Table II. Failure did not occur until a loading of 181 lbs./sq. ft.

TABLE II

| Gauge pressure | Total load, pounds | Sq. ft. load test | Deflection, inch | Equiv. uniform load deflection | Ratio of deflection to span |
|---|---|---|---|---|---|
| 10 | 465 | 67 | .06 | | |
| 50 | 790 | 114 | .12 | .056 | 1/550 |
| 150 | 1,115 | 162 | .25 | .117 | 1/265 |
| 170 | 1,250 | 181 | | .234 | 1/132 |

EXAMPLE III

A 2 inch thick test slab, specimen 3, was made similar to that of Example II, the particulars again being shown in Table V. This specimen load tested at 152 lbs.

EXAMPLE IV

Comparative nail holding tests were conducted on specimens 2 and 3 and on a well known commercial 2 inch wood fiber board, Permadeck, trademark of W. R. Grace & Co. Three nails of each kind were driven into each test specimen and pulled out with a scale to measure pull-out resistance. The results are recorded in Table III. Each figure shown in the table is the force required to pull an individual nail. The comparison clearly shows a trend that the wood flake slab has superior nail holding ability over the wood fiber slab. The pull-out resistance for the wood flake specimens is sufficient to render them suitable as a nailing base for most applications.

TABLE III

| | Wood flake slabs [1] | | |
|---|---|---|---|
| Description of nail | Specimen 2, lbs. | Specimen 3, lbs. | Wood fiber slab, lbs. [2] |
| ES | 40-25-38-45 | 88-70-85 | 30-75-59 |
| 1" Tubelok | 95-90-80 | 75-75-90 | 55-78-60 |
| 1¾" Tubelok | 130-110-80 | 65-80-85 | 75-90-70 |
| 6d common galv | 65-73-32 | 15-55-35 | 15-18-18 |
| 1" roofing galv | 78-15-10 | 10-20-15 | 10-8-15 |
| 1¼ roofing | 70-40-155 | 30-55-25 | 10-25-10 |

[1] Weight of 2" wood flake slab/sq. ft. is 6.35 lbs.
[2] Weight of 2" wood fiber slab/sq. ft. is 5.98 lbs.
[3] Point broke off.
[4] A fourth nail seemed to drive too easily and was pulled by hand with little resistance.

EXAMPLE IV

Specimen 2 was subjected to a thermal conductivity test. The procedure to determine thermal conductivity was the ASTM C-177 guarded hot plate test. The density of the slab was measured as 38.11 pounds per cubic foot and thickness of the slab was taken as 1.90 inches. The slab had a thermal conductivity, K, of 0.56 (B.t.u. in./sq. ft., hr. °F.).

EXAMPLE V

Specimen 2 was also subjected to a determination of noise reduction coefficient (N.R.C.) according to the ASTM C-384 tube method. Conversion from normal to random incidence of sound was made with 1958 correlation tables provided by a reputable acoustical laboratory. The overall N.R.C. rounded off to nearest .05 was .75. The particular results are recorded in Table IV. Quite unexpected is the excellent 500 Hz. value of .94, this frequency level being considered the most important figure for normal sound control. In addition, there is an unexpectedly high N.R.C. value at 2000 Hz.

TABLE IV

| Thickness tested (in.) | Noise reduction coefficients | | | | |
|---|---|---|---|---|---|
| | 250 Hz. | 500 Hz. | 1,000 Hz. | 2,000 Hz. | N.R.C |
| 1.90 | .35 | .92 | .77 | .94 | .74 |
| | .38 | .95 | .71 | 1.00 | .76 |
| | .42 | .94 | .55 | 1.00 | .73 |

TABLE V

| Specimen No. | Flake, lbs. | Moisture content of flake, percent | Presoak sodium silicate solution, lbs. | Mixed with flakes | | | Specimen size, in. | Strength at 7 days, 2 in. thick basis, lbs. |
|---|---|---|---|---|---|---|---|---|
| | | | | Portland cement, lbs. | Water, lbs. | Calcium chloride, lbs. | | |
| 1 | 1.2 | 20-25 | 1.48 | 1.8 | 0.14 | 0.02 | 1 x 12 x 12 | 185 |
| 2 | 15.6 | 20-25 | 14.8 | 25.5 | 2.0 | 0.7 | 2 x 32 x 32 | 181 |
| 3 | 15.6 | 20-25 | 16.3 | 25.5 | 2.0 | 0.7 | 2 x 32 x 32 | 152 |

What is claimed is:
1. A lightweight cemented product comprising wood flakes the major proportion of which have the dimensions of about 1 to 4 inches along the grain, about ¼ to 1 inch wide and up to about 0.030 inch thick; the wood flakes being coated with and bonded together with about 1.25 to 3 parts by weight per part by weight of the wood flakes of inorganic mineral-containing rigid setting binder, the flakes being arranged in a loose weave in random lengthwise orientation and substantially flat relationship.

2. The product of claim 1 wherein the binder is an hydraulic cement.

3. The product of claim 2 wherein the hydraulic cement is present at a level of about 1.4 to 1.7 parts by weight per part by weight of the wood flakes.

4. The product of claim 1 being in the form of a panel where the substantially flat relationship of the wood flakes is parallel to the faces of the panel.

5. The product of claim 2 wherein the product has a density of about 33 lbs./cubic foot to 48 lbs./cubic foot.

6. The process of making a lightweight cemented product comprising coating wood flakes which are in major proportion from about 1 to 4 inches along the grain, about ¼ to 1 inch wide and up to about 0.030 inch thick with about 1.25 to 3 parts by weight per part by weight of the wood flakes of an inorganic mineral-containing rigid setting binder; freely casting the coated wood flakes in a mold to form a loose weave by random lengthwise orientation of the wood flakes in a substantially flat relationship, compacting said coated flakes under light pressure while permitting the binder to cold set to form a bonded product.

7. The process of claim 6 wherein the wood flakes are first wet and then mixed with dry hydraulic cement until they are thoroughly coated.

8. The process of claim 6 further wherein the coated flakes are cast in a panel forming mold so that the substantially flat relationship of the flakes is parallel to the faces of the panel.

9. The process of claim 8 wherein the coated wood flakes are screened to a predetermined bulk rate prior to casting to enable casting by uniform distribution in the mold.

10. The process of claim 8 wherein the cast coated wood flakes are compacted to a thickness of from about ½ to ⅓ the original freely cast thickness.

11. The process of claim 6 wherein the product is cast to a final density of about 33 lbs./cubic ft. to 48 lbs./cubic ft.

References Cited
UNITED STATES PATENTS

| | | | |
|---|---|---|---|
| 2,854,372 | 9/1958 | Yan et al. | 161—168 |
| 3,245,867 | 4/1966 | Clarke | 161—168 |
| 3,403,205 | 9/1968 | Ottenholm | 264—109 |
| 3,451,842 | 6/1969 | Kurz | 117—98 |
| 3,459,571 | 8/1969 | Shannon | 161—161 |

WILLIAM J. VAN BALEN, Primary Examiner

U.S. Cl. X.R.

106—99, 163; 161—162; 264—109, 122, 134